United States Patent [19]

Hommes et al.

[11] Patent Number: 4,825,111

[45] Date of Patent: Apr. 25, 1989

[54] LINEAR MOTOR PROPULSION SYSTEM

[75] Inventors: William J. Hommes, Hockessin; John J. Keegan, Jr., Wilmington, both of Del.

[73] Assignee: E. I. Du Pont de Nemours and Company, Wilmington, Del.

[21] Appl. No.: 115,791

[22] Filed: Nov. 2, 1987

[51] Int. Cl.$^4$ .................... B60L 15/38; B60L 13/00; B65G 43/10; H02K 41/02
[52] U.S. Cl. .................... 310/12; 104/290; 104/299; 198/465.2; 198/619; 318/135
[58] Field of Search ............... 104/290, 292, 294, 295, 104/299, 301; 198/465.2, 619, 690.1, 795, 803.01; 310/12, 112, 114, DIG. 2; 318/38, 135, 685, 687, 696, 47

[56] References Cited

U.S. PATENT DOCUMENTS

| | | | |
|---|---|---|---|
| 3,068,373 | 12/1962 | Bekey | 310/DIG. 2 |
| 3,150,433 | 7/1963 | Kampf | 26/57 |
| 3,256,558 | 6/1966 | Andersen et al. | |
| 3,445,887 | 5/1969 | Tsien | |
| 3,803,466 | 4/1974 | Starkey | 318/135 |
| 3,890,421 | 6/1975 | Habozit | 264/289 |
| 3,904,941 | 9/1975 | Matsui | 318/135 |
| 3,932,919 | 1/1976 | Hutzenlaub et al. | 26/57 R |
| 4,081,723 | 3/1978 | Vetter et al. | 318/38 |
| 4,637,103 | 1/1987 | Hutzenlaub | 26/73 |
| 4,675,582 | 6/1987 | Hommes et al. | 318/38 |

FOREIGN PATENT DOCUMENTS 2572229 4/1986 France ...................... 310/114
48-38779 10/1973 Japan .

OTHER PUBLICATIONS

Watkins et al., "Evolution of a Linear Induction People Mover System", 28th IEEE Vehicular Tech. Conf. Denver, Colo., Mar. 22–24, 1978, pp. 133–136, WED Enterprises, Walt Disney Productions.

Primary Examiner—Peter S. Wong
Assistant Examiner—D. L. Rebsch

[57] ABSTRACT

A system for propelling individual carriages along an endless path from a first speed abutted in a stack in a carriage collection section, to a second speed spaced apart in an operational section, and to a third speed in a stack-forming section where the carriages return to the first speed in the stack. Novel carriages are propelled by a linear motor wherein each carriage has attached a synchronous and a hysteresis secondary. A first primary positioned adjacent one part of the path develops electromagnetic waves for engaging the synchronous secondaries to provide controlled spacing of the carriages, and a second primary adjacent another part of the path develops other electromagnetic waves for engaging the hysteresis secondaries to provide controlled abutting of the carriages.

57 Claims, 7 Drawing Sheets

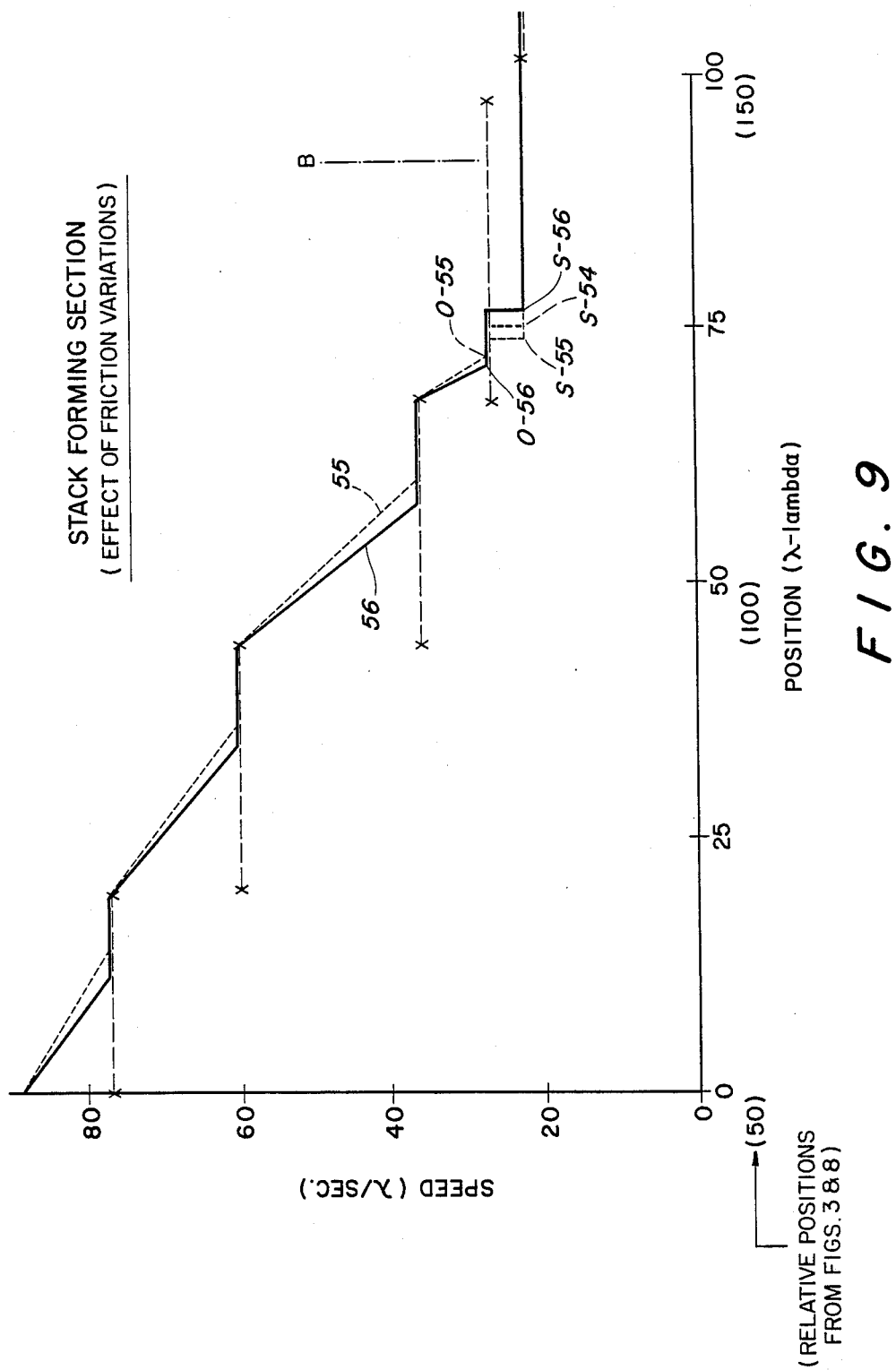

LINEAR MOTOR PROPULSION SYSTEM

BACKGROUND OF THE INVENTION

1. Field of the Invention

The field of art to which this invention pertains is linear motors and, more particularly, it is directed to methods and apparatus for propelling carriages or tracked vehicles one by one from a stack to a spaced apart condition and for returning the carriages or vehicles in a controlled fashion to the stack.

Specifically this invention involves the propelling of carriages in an endless loop from the exit of a carriage collection section, where they move abutted in a stack at a constant synchronous speed, to a second speed to space the carriages apart, after which such carriages are propelled back into the stack prior to reaching the entrance of the collection section. The speed at which the carriages move after contact with the stack is determined by the speed of the abutted carriages in the carriage collection section, against which the carriages newly arrived in the stack are constantly pressing. The carriages move asynchronously after contact with the stack and prior to reaching the entrance of the collection section.

The movement of the carriages into the stack is controlled by hysteresis secondaries attached to the carriages. These secondaries are engaged by electromagnetic waves independently developed by zones of a linear motor primary. Synchronous secondaries may also be attached to the carriages for synchronously propelling the carriages under the control of other zones of a second primary. The electromagnetic waves may vary in speed to control acceleration and deceleration of the carriages.

2. Description of the Related Art

Linear motors are well known to the art and such motors are frequently used to propel carriages or tracked vehicles in an endless loop.

U.S. Pat. No. 3,803,466 to Starkey is one example, showing the use of a linear synchronous motor propulsion system for independently propelling tracked vehicles in a loop. The vehicles or incoming trains are selectively accelerated and then decelerated at an appropriate location to allow them to travel at a slow speed and at a selected spacing through a station.

U.S. Pat. No. 3,890,421 to Habozit is another example showing the use of a linear induction motor for controlling the speed of clamps mounted on carriages moving in endless loops for biaxially drawing plastic film. And Japanese patent application 48-38779 is still another example showing the use of a linear motor to propel tenter clips in endless loops to biaxially stretch thermoplastic synthetic resin films.

It is common practice, in systems involving carriages or vehicles traveling in an endless loop, to provide a loading station or startup section where the carriages are moved at low speeds for loading of passengers as in U.S. Pat. No. 3,803,466 or for other operations and are then accelerated in an operational section. In the startup section the carriages are closely spaced and frequently are clustered or grouped in a stack as shown in the above-mentioned patents, for example. After acceleration or completion of the operation, such as film stretching, the carriages are returned to the stack, or loading section, ready to start the operation again.

It is, of course, generally required that the carriages be under control at all times in their movement in and throughout the loop. This is particularly true when the carriages or tracked vehicles, which are frequently moving at high speeds, are returned to the stack, otherwise damaging collisions may occur or machine operation may be affected.

Various techniques have evolved to solve this type of problem. One such solution is seen in U.S. Pat. No. 4,675,582 to Hommes and Keegan, owned by the assignee of the present invention. This patent, which is incorporated herein in its entirety by reference, discloses a linear synchronous motor control system which can be used to precisely propel synchronous secondaries attached to carriages at ever increasing speeds on an operational side of a loop or loops to stretch film, for example. This same system also can be used to decelerate the carriages under control on the return side of the loop. In such a system where carriage speed and spacing is varying, there can never be more than one carriage in an electrically separate group of coil windings, or zone, of the primary at a time. This constraint requires many primary zones and their associated zone controls. Such a system effectively accomplishes the task of continuously propelling carriages throughout an endless loop, but at a significant cost in hardware and complexity, particularly on the return side where stacking occurs and where such precise synchronous control of the carriages may not be required.

In carriage or tracked vehicle propulsion systems the location and speed of the carriages at startup is frequently of prime importance. For example, the tracked vehicles in the Starkey patent mentioned above, appropriately travel at a selected spacing in the station, for loading purposes. This is true in other systems as well, including the system shown in the Hommes and Keegan patent just described, where control of the secondaries, in a constant velocity section, with their precise locations known prior to acceleration, is important in the operation of the system.

The instant invention, by assuring that the stack of carriages is moved synchronously and abutted at a controlled constant speed in a carriage collection section, further assures that the carriages at startup will be in the proper position and that they will be moving at a proper controlled speed. In so doing, such invention provides an improved or alternate method for practicing the inventions of U.S. Pat. No. 3,803,466 and of U.S. Pat. No. 4,675,582, particularly on the return side, for example.

The instant invention may also be usefully applied in U.S. Pat. No. 4,081,723 to Vetter et al. for controlling carriages transporting paper sheets in a printing machine where the carriages, propelled by linear motors, travel in paired symmetry through dual endless loops. Vetter discloses using sensors and feedback to synchronize carriage movement with the rotation of printing rollers adjacent the path of the loops. Carriages are sped up, slowed down, and recirculated through the loops. Where paper sheets are picked up it would be beneficial to provide a stack of carriages traveling at a slow speed to engage the sheets. After pick up it would be beneficial to speed up and separate the carriages to pass by the printing rollers in synchronism with their rotation and then slow down, rejoin a stack of carriages, drop off the printed sheets, and pick up fresh sheets to repeat the process. Use of the instant invention to accomplish these functions would be an improvement over the system disclosed by Vetter. The instant invention may also be usefully employed in an application involving an assembly line operation where a separate loop may be provided adjacent a main conveyor line. Parts could be safely loaded on a slow moving carrier in a stack in the loop, then accelerated and synchronized with the main conveyor, the parts transferred to the main conveyor, and the carriers decelerated and stacked for reloading. An automobile assembly line may be a good application for such a system. Similarly, in a rapid-fire gun system for a ship, ammunition could be loaded remotely on slow moving carriers in a stack, transported quickly, synchronized with the transferred to the gun loading system, and then the carriers would be returned to the stack for reloading.

Accordingly, this invention makes available to the art improved methods and apparatus for propelling carriages or tracked vehicles around a loop, and solves various problems heretofore confronting the art by assuring that the propelled carriages are moved back into a stack of carriages, in a controlled manner, using a relatively inexpensive linear motor system, and that the carriages in that portion of the stack in a carriage collection section, are always abutted and that they too, are moving at a proper controlled constant speed, prior to entering a startup or operational section of a machine or carriage propulsion system.

SUMMARY OF THE INVENTION

Briefly described, the present invention uses a linear hysteresis motor, or preferably a combination of linear hysteresis and synchronous motors, to propel carriges around a loop and into and through a stack without feedback required on drive frequency, carriage position, or carriage speed.

In a preferred embodiment such invention provides continuous predictable control of dual secondary carriges throughout an endless loop by propelling a synchronous carriage secondary in a carriage collection section where carriage position and speed are controlled precisely and in an operational section where carriage spacing and speed are also precisely controlled; and by propelling a hysteresis carriage secondary in a stack forming section where controlled abutting of the secondaries is the primary requirement. The linear motor controls for the carriage collection, operational and stack forming sections of the loop are coordinated so that as the speed and spacing requirements are altered in the operational sectiion, the changes in the distribution and number of secondaries in the stack forming section can be accommodated without adding or removing carriages from the loop.

In greater particularity this invention is a method of controlling the propulsion of carriages traveling along an endless path including the steps of:
  forming a stack of carriages;
  controlling the movement of carriages in the stack in a carriage collection section, such collection section having an entrance and exit;
  propelling the carriages in the collection section at a first constant speed;
  propelling the carriages one by one from the exit of the collection section and through an operational section from the first speed to a second speed greater than the first speed whereby such carriages are spaced apart; and
  propelling the spaced apart carriages into and through a stack-forming section wherein such carriages are propelled from the second speed into the stack of carriages traveling at the first speed before such carriages reach the entrance of the collection section.

Preferably the carriages are decelerated in the stack forming section from the second speed to a third slower speed prior to reaching the trailing carriage in the stack.

All of the carriages in such stack are in an abutting relationship and all the carriages in the carriage collection section are also in an abutting relationship.

The third speed at which each carriage is propelled in the stack forming section is greater than the first speed at which the carriages are propelled in the carriage collection section and the carriages in the stack forming section are constrained to move abutted in that section at the first speed as controlled by the movement of the abutted carriages in the stack in the carriage collection section. A force is applied to the carriages in the stack forming section that initially forces the spaced apart carriages to move at the third speed and then forces the carriages together where they are constrained to move at the first speed at which the carriages are being propelled in the carriage collection section. The carriages also may be decelerated to a fourth speed before being decelerated further to the third speed.

In a preferred embodiment of the method of controlling carriage propulsion, the carriages are propelled along an endless path by a linear motor including at least a first primary positioned adjacent the path and secondaries attached to the carriages.

The primary has its coils electrically grouped into zones including at least a first zone starting at the entrance and ending at the exit of the carriage collection section for developing a first electromagnetic wave for engaging the secondaries to propel the carriages in the carriage collection section at a first constant speed. The carriages are propelled synchronously with respect to the first electromagnetic wave in this section, preferably by a synchronous secondary attached to each carriage.

The primary further includes at least a second zone positioned along the operational section for independently propelling each carriage from the first speed to a second speed which is greater than the first speed whereby to space the carriages apart in this section. The carriages are preferably propelled synchronously, by synchronous secondaries, in this section as well. The primary may, in another preferred embodiment, include a plurality of second zones for synchronously propelling each carriage from the first speed to speeds greater than the first speed in the operational section.

In another preferred embodiment of this invention the carriages are propelled along an endless path by a linear motor including at least a first primary positioned adjacent the path and hysteresis secondaries attached to the carriages.

In this embodiment the primary includes a first zone positioned along the carriage collection section for developing a first electromagnetic wave for engaging the hysteresis secondaries thereby to propel the carriages synchronously at the first speed in the carriage collection section.

The primary further includes at least a second zone positioned along the operational section for developing a second electromagnetic wave for propelling each carriage from the first speed to a second speed which is greater than the first speed whereby to space the carriages apart in this section. The second wave engages the hysteresis secondaries preferably to propel the carriages synchronously in this section. In another embodiment the second wave engages the hysteresis secondaries to first propel the carriages asynchronously from the first speed to the second speed and then essentially synchronously in the operational section.

Preferably the carriages are decelerated in the stack forming section from the second speed to a third speed prior to reaching the trailing carriage in the stack and the primary further includes at least a third zone positioned along this stack forming section for developing a third electromagnetic wave for propelling the carriages from the second speed to such third speed, which is less than the second speed, in this section. The third wave engages the hysteresis secondaries to propel the carriges synchronously in one part of the stack forming section and prior to reaching the trailing carriage in the stack and this same wave propels the carriages asynchronously in the stack forming section after the carriages reach the stack and prior to the entrance of the carriage collection section.

In the preferred method of this invention the carriages are propelled along an endless path by a linear motor including first and second primaries positioned adjacent the path and secondaries attached to the carriages. Each carriage has a synchronous and a hysteresis secondary attached to it.

In this embodiment the first primary has coils electrically grouped into zones including at least a first zone positioned along the carriage collection section for developing a first electromagnetic wave for engaging the secondaries to propel the carriages at a first speed in this section. The first wave engages the synchronous secondaries to propel the carriages synchronously at the first speed in the carriage collection section.

The first primary also has at least a second zone positioned along the operational section for propelling each carriage from the first speed to a second speed which is greater than the first speed whereby to space the carriages apart in this section. The second wave engages the synchronous secondaries to propel the carriages synchronously from the first speed to the second speed in such operational section. A plurality of second zones may be provided, in this embodiment, for developing electromagnetic waves to propel the carriages from the first speed to greater speeds in this section.

Further, the second primary has at least a third zone positioned along the stack forming section for developing a third electromagnetic wave for propelling the carriages from the second speed to a third speed, which is less than the second speed, in this section. The third electromagnetic wave engages the hysteresis secondaries to decelerate the speed of the carriages from the second speed to the third speed before reaching the trailing carriage in the stack of abutting carriages, in the stack forming section. The carriages are propelled synchronously by the third wave in the stack forming section and prior to reaching the trailing carriage in the stack and thereafter are propelled asynchronously in such stack forming section after the carriages reach the stack and prior to reaching the entrance of the carriage collection section.

Lastly, in broad concept, this invention is a method of controlling the propulsion of a plurality of spaced apart carriages into a stack of moving abutted carriages, including the steps of:
propelling the abutted stack of carriages at a first speed;
propelling a spaced apart carriage into a controlled impacting abutment with the stack of abutted carriages by propelling the spaced apart carriages at a second speed greater than the first speed before the carrage reaches the stack, using a linear motor.

Even more broadly, this invention is a method of propelling abutted articles from a collection section exit to a spaced-apart condition and back to the collection section entrance including the step of propelling the articles using hysteresis secondaries attached thereto.

Such invention further is a method of controlling the propulsion of a plurality of spaced apart carriages into a stack of moving abutted carriages, using a linear motor, including the steps of:
propelling a spaced apart carriage synchronously with respect to an electromagnetic wave at a third speed, in a stack forming section, prior to reaching the trailing carriage in the stack which is traveling at a first speed less than the third speed; and
propelling the carriages asynchronously with respect to the same electromagnetic wave, in the stack forming section, after the carriage reach the stack.

And in its broadest concept, this invention is a method of propelling carriages asynchronously with respect to an electromagnetic wave in one part of a stack and synchronously with respect to another electromagnetic wave in the other part of the stack.

These methods are accomplished by an apparatus or system which utilizes a linear motor for propelling novel carriages from a carriage collection section to a spaced-apart condition and back to the collection section. Such systems will now be described in detail.

BRIEF DESCRIPTION OF THE DRAWING

FIG. 9 is a graph of two stable operating curves for the stack-forming section showing the effects of changing friction on the carriages.

DESCRIPTION OF THE PREFERRED EMBODIMENTS

Figure 1:
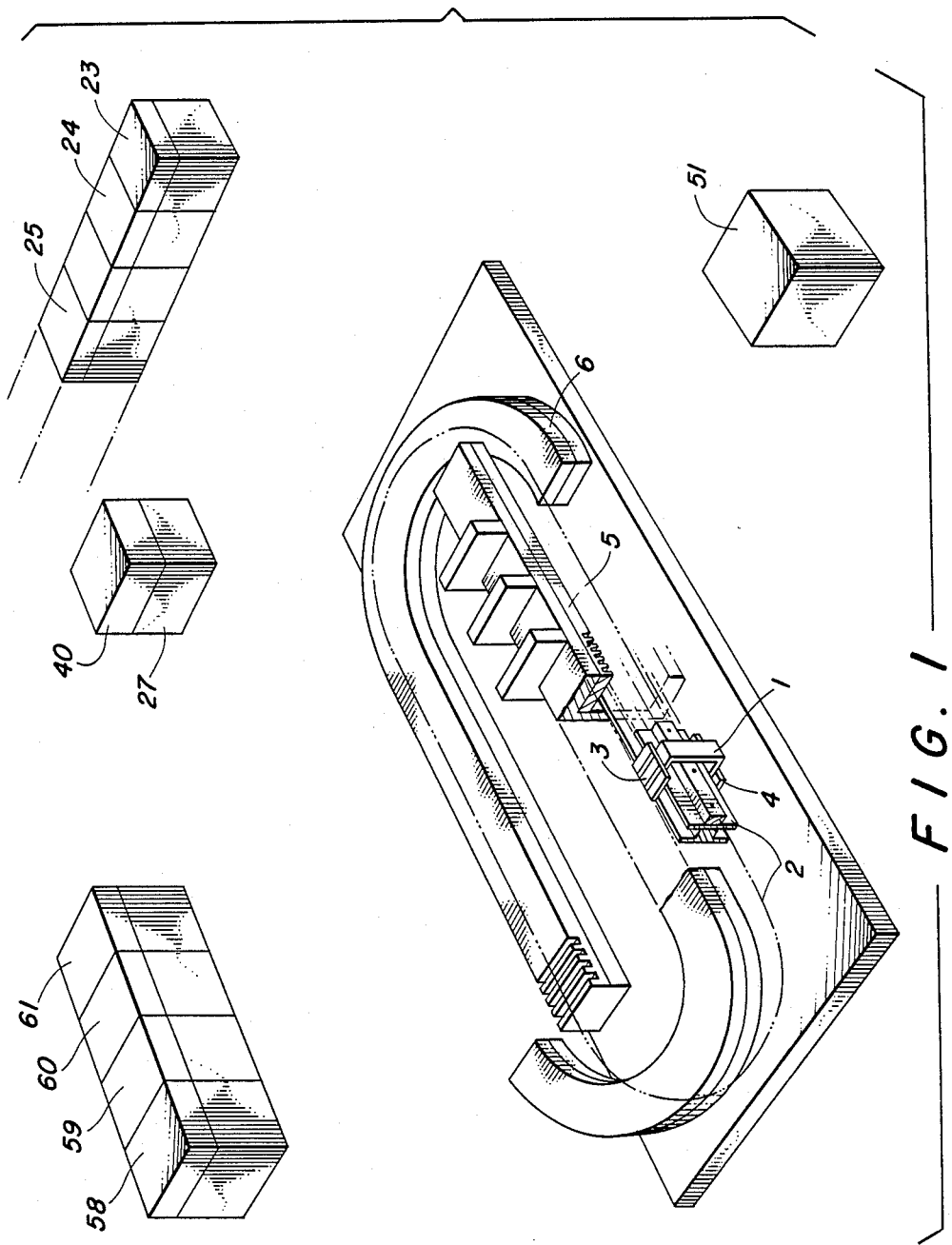
FIG. 1 is an isometric view of a linear motor propulsion system of this invention for propelling carriages or tracked vehicles around an endless loop or track.

In a linear motor propulsion system for propelling carriages around an endless loop, there are various ways of accelerating and separating the carriages, but a simple reliable method and apparatus to decelerate the carriages to rejoin a moving stack, in a controlled manner, has not heretofore been available.

The system of this invention provides such a method by continuously propelling spaced apart carriages into a stack by controlling a linear motor primary positioned adjacent the carriages to develop an electromagnetic wave that acts on a hysteresis secondary attached to each carriage. The primary is electrically divided into groups of coil windings or zones that are each independently controlled. These zones can be powered to propel the hysteresis secondary either synchronously or asynchronously from a second speed to a third speed just above the first speed of the stack. When the carriage encounters the stack, the zone at the stack entrance propels the hysteresis secondary asynchronously to press the carriages together. This fixes the location of the carriages at a known value so that subsequent accurate control of carriage movement and spacing is made possible.

The instant invention, in its preferred form, uses a combination of hysteresis and synchronous secondaries to propel the carriages around the loop and through the stack. The system provides continuously predictable control of the carriages on an operational side of the loop where carriage spacing and speed are controlled precisely and on a return side of the loop where controlled abutting of the carriages in the stack is accomplished. The linear motor controls for the operational and return sides are coordinated so that as the spacing requirements are altered on the operational side, the changes in the number of carriages on the return side can be accommodated without adding or removing carriages from the loop. The controls for the two sides also coordinate speed scale-up on the operational side and the resultant changes in braking and stacking requirements on the return side.

The movement of the carriages is carefully and constantly controlled on the operational side of the loop by the synchronous secondaries, and carriage movement into the stack is controlled by the hysteresis secondaries. This novel use of dual secondaries on each carriage plays a significant role in the operation of the preferred embodiment of the system.

In this application, a "synchronous secondary" is one which has a permanent magnetic pole or poles that exist in a magnetic field and remain the same regardless of the electromagnetic field of the motor primary acting on them and a "hysteresis secondary" is one which has a temporary magnetic pole or poles that exist in a magnetic field and remain the same unless the electromagnetic field, such as that of the motor primary, changes polarity so that it is not aligned with the hysteresis secondary. When in a strong non-aligned field, the hysteresis secondary polarity changes to correspond (opposing polarity) to the polarity of the new electromagnetic field.

A synchronous secondary can only develop its rated force when it is moving synchronously at the same speed, i.e., no slip, as the traveling electromagnetic wave (hereinafter frequently referred to as an "EM Wave") propelling it, and when its polarity is properly aligned with the wave. When slip occurs, the synchronous secondary force and speed become erratic and the secondary may come to a stop.

A hysteresis secondary can develop at least a first force when it is operating essentially synchronously (no or very low slip) or a second force when it is operating asynchronously (substantial slip) with the traveling EM wave. In the region of very low slip, the force is between the level of no slip and substantial slip. The hysteresis secondary can be propelled essentially synchronously with the EM wave as long as an opposing force does not exceed its second force, so it can travel at or near the same speed as the EM wave. It can also be propelled asynchronously traveling at a speed substantially different from the EM wave and continue to develop its second force regardless of the amount of slip. When its second force is greater than the opposing force, the hysteresis secondary speed will essentially reach that of the EM wave. When its first force is greater than the opposing force, the hysteresis secondary speed will reach that of the EM wave and its polarity will correspond (opposite poles) to that of the EM wave, and the secondary will travel synchronously with it.

To summarize, a synchronous secondary can only be propelled synchronously with an EM wave, while a hysteresis secondary can be propelled either essentially synchronously or asynchronously with such wave. In the instant invention, this latter principle enables the hysteresis secondaries attached to the carriages to constantly press such carriages together after they contact a stack and before they reach the entrance to a carriage collection section, where their movement is controlled prior to operational startup of the system of such invention.

Referring specifically to the drawing, FIG. 1 shows the endless loop traveled by the carriages, as propelled in accordance with this invention. Such carriages, 1, are supported and guided by a track that defines the path the carriages take around the loop. Upper and lower secondaries 3 and 4 are attached to each carriage body. The track positions these secondaries 3 and 4 fixed distances (exaggerated for clarity) away from upper and lower linear motor primaries 5 and 6, which are positioned adjacent the track.

Figure 2:
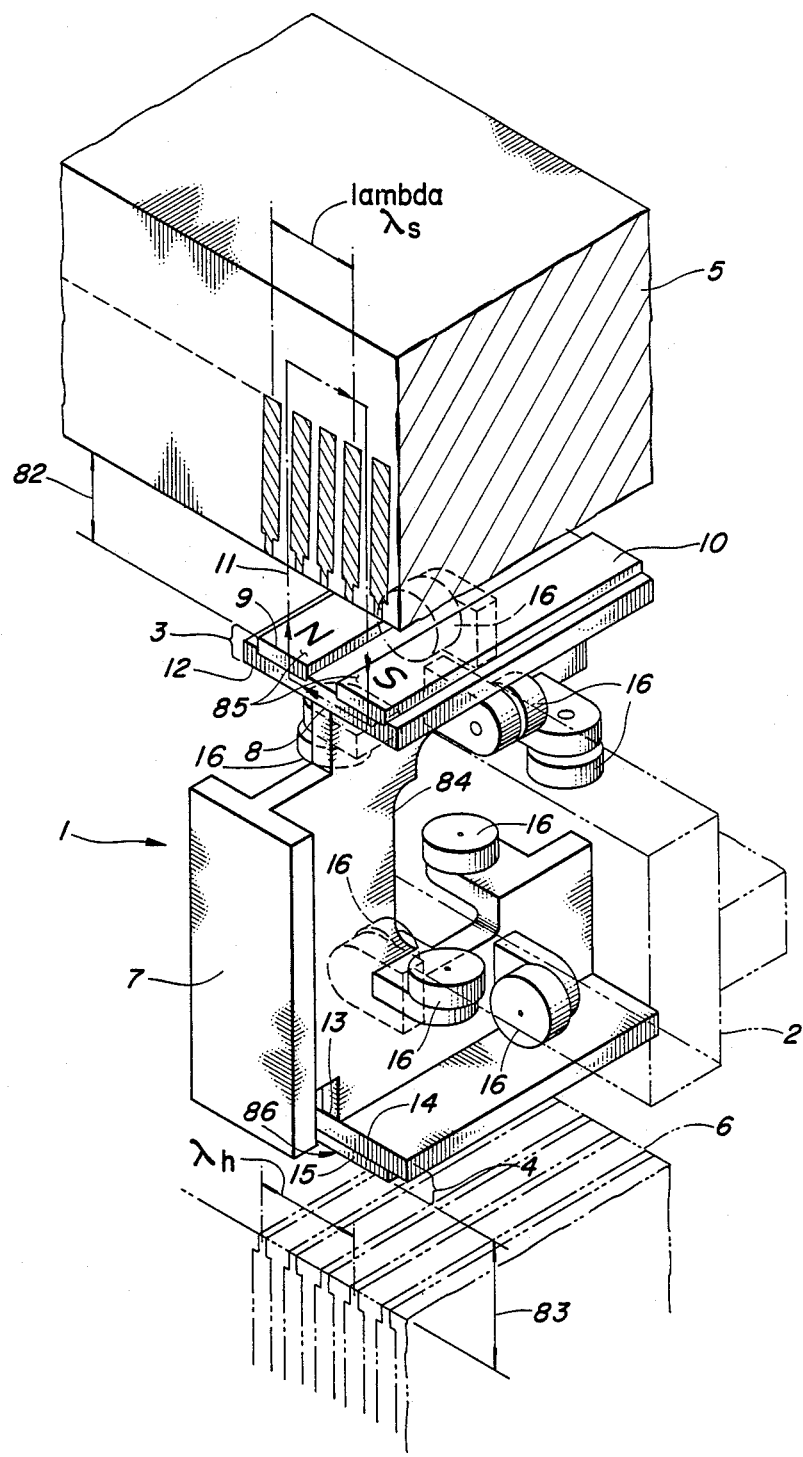
FIG. 2 is an isometric view of a dual-secondary carriage of the invention.

As best seen in FIGS. 1 and 2, each carriage 1 is generally a "C" shaped structure that largely surrounds the track 2. On the outside of the "C" shape is a first surface 7, suitable, for example, for mounting an article that is to be moved by the carriage.

In a preferred embodiment, a synchronous linear motor secondary 3 is attached to a second surface 8 at the top of the "C" shaped carriage 1. Such secondary includes two permanent magnets 9 and 10 with alternate poles facing outwardly to complete a magnetic flux path, shown at 11, which includes the upper primary 5. The magnets which are affixed to a high magnetic permeability back iron material 12 such as steel or cast iron, are spaced with their poles apart at a distance, lambda s, equal to the pole pitch of the upper primary 5 and they form a third surface 85 which is compatible with the shape of the opposing surface of the primary 5. The magnet material may be conventional permanent magnet material such as tungsten or chrome magnet steel, or permanent rare-earth magnets such as aluminum-nickel-cobalt alloys (alnico), cobalt magnet steel, or preferably samarium cobalt.

Further, in this embodiment, a hysteresis linear motor secondary 4 is attached to a fourth surface 13 at the bottom of the "C" shaped carriage 1. This secondary consists of hysteresis material 15, which forms poles on its lower face when in the electromagnetic field produced by the lower primary 6. The secondary may also preferably include a high magnetic permeability back iron 14. In some cases, however, it may be more convenient to mount the hysteresis material on a surface having a low permeability such as aluminum, or a non-metal surface, or to mount the hysteresis material along its edges with no backing surface. It may also sometimes be desirable to mount the hysteresis material on a grooved, high permeability surface. Such variations are often used in rotary hysteresis motors. The lower face of the hystersis material forms a fifth surface 86 which is compatible with the shape of the opposing surface of the lower primary. The carriage body 84 may be made of a high magnetic permeability iron or steel that conveniently also forms the back irons 12 and 14. The geometry (thickness, shape, area) of the hysteresis material is a factor determining the force developed in the EM field. The hysteresis material is one having a high magnetic hysteresis and may be unmagnetized magnet material as listed above, and is preferably unmagnetized alnico. A flux path similar to that shown at 11 is formed with the lower primary 6 and the hysteresis secondary 4. This novel carriage 1 with its dual secondaries 3 and 4 is significant in the preferred operation of this invention.

The pole pitch of lower primary 6, lambda h, does not have to match the pole pitch lambda s of upper primary 5 and, since the hysteresis material does not have fixed poles, the pole pitch of the lower primary can be any convenient pitch. In a preferred embodiment, however, the pole pitch of the upper and lower primaries is the same, i.e., lambda s=lambda h=lambda.

A system of eight rollers 16, on each carriage ride on four elongated surfaces of the rectangular track 2 to maintain the orientation of the carriage, as shown, and provide anti-friction travel of the carriage along the track. The outer surfaces of the magnets 9 and 10 and the hysteresis material 15 are closely spaced by constant distance clearance gaps 82 and 83 (exaggerated for clarity) with the adjacent surfaces of the primaries 5 and 6, as shown in FIGS. 1 and 2. The surfaces of the primaries and the magnets and hysteresis material can be planar, as shown, or for certain applications the primaries may have an elongated concave or convex surface, with the magnets and hysteresis material shaped to be compatible. For instance, the magnets could define a convex surface, elongated in the direction of travel, which is closely spaced from an elongated concave primary surface. If the hysteresis secondaries are always traveling along a radius when adjacent the lower primary, the outer surfaces could also be a toroidal surface. In general, the outer surfaces of the secondaries and the compatible surface of the primaries are shaped to maintain a constant clearance gap between the moving secondaries surface and the closely spaced surface of the primaries.

As best seen in FIGS. 1, 4, 5 and 6, the upper or first primary 5 is located adjacent the track 2, in part of the loop, as shown at 17, in position to act on the upper synchronous secondary 3 on each carriage. The lower or second primary 6 is located in another part of the loop, as shown at 18, adjacent the track 2, to thereby act on the lower hysteresis secondary 4 on each carriage. These primaries propel the dual secondaries, and the carriage to which they are attached, in an endless loop, through the three prime functional sections of the system; a carriage collection section 41, an operational section 42 and a stack forming section 43. The operations in these sections will be described later in greater detail.

Figures 4, 5, 6:
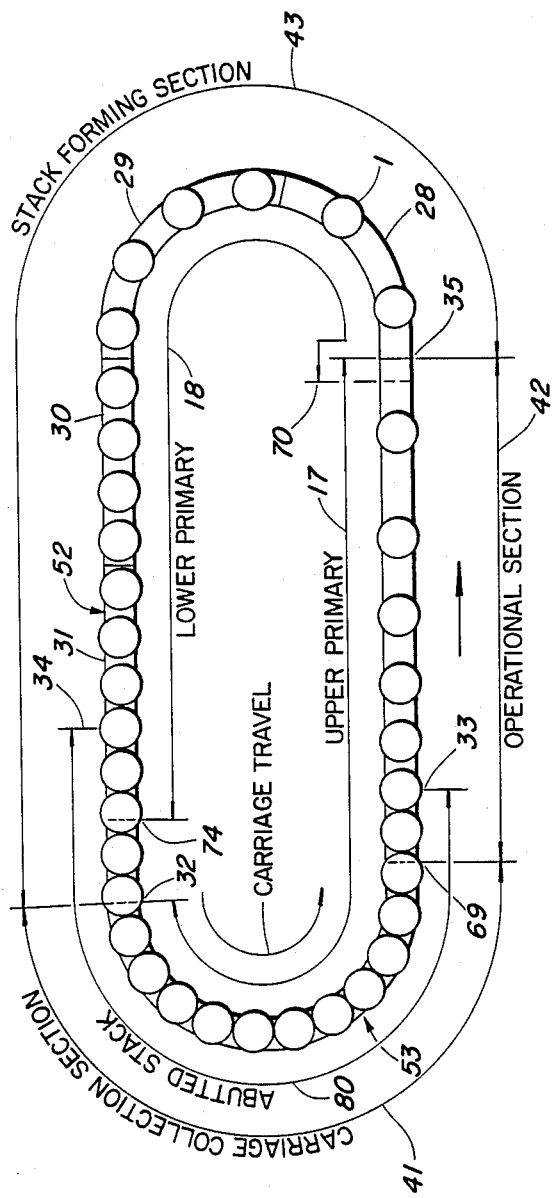
FIG. 4 is an exemplary plan view of the system at a given instant in time showing the carriages distributed around the endless loop.
FIG. 5 is a plan view of an upper first primary for propelling the carriages around a part of the loop.
FIG. 6 is a plan view of a lower second primary for propelling the carriages around the rest of the loop.

FIG. 4 is a plan view of a "snapshot" of the carriages 1, indicated by circles, traveling around the endless loop. The carriages are shown superimposed on the upper and lower primaries 5 and 6. FIGS. 5 and 6 are plan views of such primaries (shown shaded) showing their relative positions, 17 and 18, in the loop.

The upper linear motor primary 5 is divided into a plurality of zones, such as first zone 19 and second zones 20, 21, etc., 22, as shown in FIG. 5, to permit synchronous control of the synchronous secondaries 3 in their movement in the carriage collection and operational sections 41 and 42 of the loop. A suitable system for controlling such secondaries is shown in U.S. Pat. No. 4,675,582 to Hommes and Keegan, mentioned previously.

In this patent, a synchronous linear motor primary is electrically divided into groups of coil windings or zones, with each zone being independently powered and controlled. Each zone is powered by a zone driver having switches to switch a DC voltage to provide a synthesized three phase AC power waveform to the coils in each zone. Each zone driver has a zone controller with a steady state memory and memory access means to provide switching instructions to the zone driver for a given operating condition. The memories in each zone controller contain the same number of predetermined binary switching instructions to define a switching waveform that can slope in frequency between two limits. The steady state switching instructions are simultaneously output from all zone controllers and are paced by a common time base to start, step through, end, and restart the accessing of each memory in each zone controller in unison. In an acceleration portion 57 of the operational section 42 of the system of the instant invention, this causes varying speed, repeating EM waves to be developed along the primary that are coordinated in time to independently propel one synchronous secondary after another through the acceleration portion. A plot of frequency vs. time of such a wave would have a sawtooth shape. In this portion there is never more than one secondary in a zone at a time. When it is desired to change operating conditions, a transition memory in each zone controller is accessed that has instructions to propel several secondaries, each uniquely as required. At the end of the transition, a different steady state memory is accessed repeatedly to propel each secondary the same for as long as it is desired to remain at the new operating condition. A central controller coordinates the simultaneous transfer from one control memory to another in all zones. A system computer coordinates overall system operation.

The carriage collection and operational sections 41 and 42 of the instant system are closely coordinated and carriage movement in such sections is under the control of the upper first primary 5, in this part of the loop. In these sections each zone of the primary, including first zone 19, and second zones 20 through 22, has its own independent driver and controls, such as 23, 24, etc. and 25, that are electrically connected respectively to such zones and are coordinated by a central controller 27, which includes a time base 40, and a computer 51 to define a linear synchronous motor control system. This system provides synchronous control of a plurality of carriages in part of an abutted stack of carriages in the carriage collection section 41 as powered by zone 19, as controlled by driver and control 23. This system also provides independent synchronous control of each carriage 1 as it accelerates and separates from adjacent carriages along the operational section 42 of the loop. Although there are a plurality of zones shown in the acceleration portion 57 of the operational section, in a simplest case, where the synchronous secondaries on adjacent carriages are widely separated when the carriages are abutted, the acceleration portion 57 may consist of only a single zone several lambda long. With this initial wide spacing, the secondaries can be independently accelerated and never have more than one secondary in one acceleration zone at a time.

While the synchronous linear motor system just described is highly effective for accelerating carriages, and further may be used to return the carriages to a stack, this invention offers an improved system, particularly for stacking the carriages on the return side of the loop. This stacking operation is under the control of the lower linear motor primary 6.

Such linear motor primary is also divided into a plurality of zones, e.g., third zones 28, 29, 30 and 31, as shown in FIG. 6, to permit a controlled, stepped deceleration of the carriages as they pass through the stack forming section 43 of the loop, and cause controlled impact and pressing abutment of the carriages before they meet the accumulated stack of carriages in the carriage collection section 41. In each lower primary zone the speed of the EM wave is constant, not varying, and since a synchronous relationship with the hysteresis secondary on the carriage does not always exist, there is no critical phase relationship between zones that requires precise waveform coordination between such zones. For these reasons, conventional motor drives and controls can be used for each zone of lower primary 6, such as driver/controls 58, 59, 60, 61 that are electrically connected respectively to the third zones 28, 29, 30 and 31 of the primary. Conventional inverter type drives are preferably used in this part of the system. Their frequency is controlled by the computer 51, based on system requirements.

The carriage collection section 41 has an entrance and an exit, as shown in FIG. 4. It is critical, in the operation of the system of this invention, that the carriages 1, under the control of the hysteresis secondaries 4, be propelled into the moving stack of carriages prior to reaching the entrance to the collection section. Specifically, such carriages are propelled by zone 31 of the lower primary 6 in this portion of the stack forming section 43, which zone acts on each hysteresis secondary 4 to propel the carriage into the stack and to continue that pressure so to push the carriages together, prior to reaching the entrance of the collection section 41.

It is important, during system operation, that there is a stack of moving carriages 80 in the loop, such as the one shown in FIG. 4. Such stack has an entrance at about 34 and an exit at about 33. By "moving queue" or "moving stack" of carriages is meant a region of abutted carriages that has the exit end of the region "fixed" in position in the loop, and has moving carriages continuously entering the entrance end, moving through the stack, and leaving the exit end. At this exit end of the stack, the carriages should be propelled "synchronously" at a precisely known speed and position determined by some means engaging the carriage such as a sprocket, screw thread, or synchronously acting linear motor. This ensures that when it is desired to separate the carriages, their exact position and speed are already precisely known without the need for sensors or other feedback. The stack 80 itself does not travel around the loop but one end of the stack may move as the quantity of carriages in the stack change. The carriages within the stack are all traveling at the same speed as they move through the stack. Within the stack, the spacing between carriages is constant and the carriages are preferably abutted. The position in the loop of the entrance and exit ends of the stack, as distinguished from the entrance and exit of the carriage collection section 41, varies by at least the width of a carriage as a carriage instantaneously abuts or separates from the stack and thereby redefines the position of the stack ends.

The abutted stack of carriages 80 must always completely fill the carriage collection section 41, in which synchronous propelling of part of the stack is required. As shown in FIG. 4, the carriage collection section is defined by the first synchronous zone 19 that engages a plurality of synchronous secondaries 3 on the carriages that are abutted to progressively develop a propelling force that exceeds any other forces on the carriages in the stack. Such other forces may be a stack pressing force (developed in the stack forming section to be explained later), plus frictional forces on the carriages and external forces placed on the carriages in the stack, such as film tension, for example, where the instant system is used in a film tenter operation. If all of these forces on the carriages in the stack are low, the carriage collection section could be shorter than shown, for instance it may only extend from position 69 to 33 in FIG. 4, where the carriages are shown synchronously propelled in the stack by zones 20 and 21 in the operational section. It is preferred, however, to provide a separate zone, zone 19, to provide synchronous propelling of part of the stack. The secondaries 3 on the carriages must always enter zone 19 at a fixed spacing and in synchronism with the EM wave developed there.

Abutting of the carriages is the best way to precisely fix secondary-to-secondary spacing in the stack forming section of the loop, where the hysteresis secondaries 4 can slip varying amounts on the EM wave, but within predictable limits. The trailing carriage in the stack must always be located before the end of lower primary 6, since the force developed on the hysteresis secondaries determines the total pressing force keeping the carriages abutted before entering the carriage collection section 41. The end of the lower primary is fixed in the loop by end 74 of zone 31. The stack entrance, at 34, must also be located after a position, at about 52, where the carriages have decelerated to an "overspeed" slightly greater than the stack speed. This position is not fixed in the loop but varies with a given operating condition, as will be best understood during the discussion of FIGS. 8 and 9. The overspeed is predetermined by the preset EM wave speed in hysteresis zone 31 at the end of the stack forming section. This velocity may be from about 5–100 feet per minute higher than the stack speed determined by the EM wave in synchronous zone 19. The impact speed is defined by the difference between the overspeed and the stack speed and must be kept low to avoid damage to the carriage entering the stack. The overspeed, determined by the EM wave engaging a hysteresis secondary, acts to propel the carriages into controlled abutment with the entrance end of the stack and propels the carriage into pressure abutment within the stack.

The minimum deceleration distance of each carriage is determined by the initial carriage speed, the total weight of the carriage, frictional loads on the carriage, and the force developed by the EM wave on the hysteresis secondary (a function of coil current, magnetic air gap, slip, and secondary geometry). These factors must be taken into consideration in determining the maximum allowable entrance end-of-stack position on the stack forming side of the loop. In most situations there is an effort to keep all of these factors constant, but mechanical tolerances cause slight variations from carriage to carriage. The random nature of these variations, however, will average to a "constant" value over many carriages.

The entrance end of the abutted stack of carriages occurs before the carriages leave the stack forming section and enter the carriage collection section at 32. The speed of the stack, however, is set by the speed of the EM wave, in zone 19, acting on the synchronous secondaries 3, where no slip occurs, and the stack is being propelled at a constant known speed. The pole pitch of the EM wave in zone 19 equals the pole pitch of the stacked carriages so all the carriages in this zone can be propelled simultaneously by a common EM wave. From the end of the stack to the end of the lower primary zone 31, from 34 to 74, however, the EM wave in zone 31 in the stack forming section is developing a force on the hysteresis secondary 4 on each carriage to press the carriages into an abutted condition. This hysteresis secondary stack force must always be less than the total pull-out force of the synchronous secondaries in the stack, so synchronous propelling of the stack is maintained. For different operating conditions where the stack length increases and more hysteresis secondaries are being propelled in the stack, the force developed by each of the hysteresis secondaries may have to be decreased to maintain the total hysteresis stack force below the total synchronous pull-out stack force. It is also desirable to keep the total hysteresis stack force low to avoid unduly high contact forces between the carriages.

In summary, then, this invention, briefly described, is a system for propelling carriages from a stack in a carriage collection section 41 to a spaced-apart condition and back to the collection section by propelling the carriages along an endless track 2, using a linear motor. Such system, in a preferred embodiment 1 includes a first primary 5 positioned along a first part of the track and a second primary 6 positioned along a second part of the track. The carriages, which are guided around the track, each has a synchronous secondary 3 positioned adjacent the first primary 5 and a hysteresis secondary 4 positioned adjacent the second primary 6; control means are provided for each primary whereby the first primary 5 propels the carriages through the collection section 41 and accelerates them from an abutted to a spaced-apart condition, and whereby the second primary 6 decelerates the carriages, propels them into an abutted condition in a moving stack and applies pressure to the abutted carriages before the collection section entrance.

The entrance to the carriage collection section 41 is located at the beginning of the first primary 5. The trailing carriage in the moving stack of abutted carriages is always located before the end of the second primary 6.

Further, in this embodiment, the first primary 5, is provided with coils electrically grouped into zones, including a first zone 19 and a plurality of second zones 20–22. The second primary 6 also has its coils electrically grouped into a plurality of third zones 28–31.

The system's basic operational units include a carriage collection section 41, an operational section 42 and a stack forming section 43. The carriage collection section has an entrance and an exit and one end 32 of the first zone 19 of the first primary 5 is located adjacent the entrance to the carriage collection section 41 and the other end 69 is preferably located adjacent the exit of such carriage collection section. Further, in this embodiment, one end of the first of the plurality of second zones 20–22 of the first primary 5 is located adjacent the start of the operational section 42 and the other end of the last of the plurality of second zones of the first primary 5 is located adjacent the finish of the operational section. The plurality of third zones 28–31 of the second primary 6 are located adjacent the stack forming section. The system has means to independently develop electromagnetic waves in each of the zones for controlling the propelling of the carriages 1 through all the sections.

The system just described is adapted to propel carriages around a loop and into and through a stack by a novel method or methods of operation. In so doing such carriages are propelled, in the preferred embodiment, by a linear motor having hysteresis and synchronous secondaries 3 and 4 attached to the carriages 1 that are traveling continuously in an endless loop defined by a guide track and are propelled by discrete zones of linear motor primaries positioned adjacent the track. Such method includes the steps of:

propelling the carriages along the first zone 19 of the first primary 5 by acting on the synchronous secondaries 3 to propel the carriages in an abutting relationship in a stack, in a carriage collection section 41, at a first constant speed;

propelling the carriages along the second zone or zones 20–22 of the first primary 5 by acting on the synchronous secondaries 3, one by one, to accelerate the carriages, in an operational section 42, from the first speed abutted to a second speed spaced apart;

propelling the carriages along at least a third zone 31 of the second primary 6 by acting on the hysteresis secondaries 4 to decelerate the carriages, in a stack forming section 43, from the second speed spaced apart to a third speed close together, the third speed being greater than the first speed;

essentially synchronously propelling the carriages along one part of the third zone 31 at the third speed prior to contact with the abutted carriages in the stack forming section 43; and asynchronously propelling the carriages along another part of the third zone 31 to produce an abutting force which presses the carriages into the abutted carriages which are moving at the first speed in the stack forming section 43.

In a broader sense, this invention is a method of controlling the propulsion of a plurality of spaced apart carriages into a stack of moving abutted carriages including the steps of propelling the abutted stack of carriages at a first speed and propelling a spaced apart carriage into a controlled impacting abutment with the stack of abutted carriages by propelling the spaced apart carriages at a third speed greater than the first speed before the carriage reaches the trailing carriage in the stack, using a linear motor.

And, lastly, this invention is a method of controlling the propulsion of a plurality of spaced apart carriages into a stack of moving abutted carriages, using a linear motor, including the steps of propelling a spaced apart carriage essentially synchronously with respect to an electromagnetic wave at a third speed, in a stack forming section 43, prior to reaching the trailing carriage in the stack which is traveling at a first speed less than the third speed, and propelling the carriages asynchronously with respect to the same electromagnetic wave, in the stack forming section 43, after the carriages reach the stack. In this method, the linear motor comprises a primary and at least a hysteresis secondary attached to each of the carriages and the abutted carriages in the stack move synchronously at the first speed with respect to another electromagnetic wave.

Finally, in its broadest sense, such invention is a method of propelling carriages asynchronously with respect to an electromagnetic wave in one part of a stack and synchronously with respect to another electromagnetic wave in the other part of the stack. The carriages are propelled asynchronously with respect to the EM wave developed by zone 31 of the lower primary 5 and synchronously with respect to the EM wave developed by zone 19 of the upper primary 5.

The third zone 31 of the lower primary acts on the hysteresis secondaries 4 to propel the carriages into the stack, prior to their entrance into the carriage collection section 41. In so doing, such secondaries and associated primary together function as a hysteresis linear motor in this significant part of the overall system.

Figure 7:
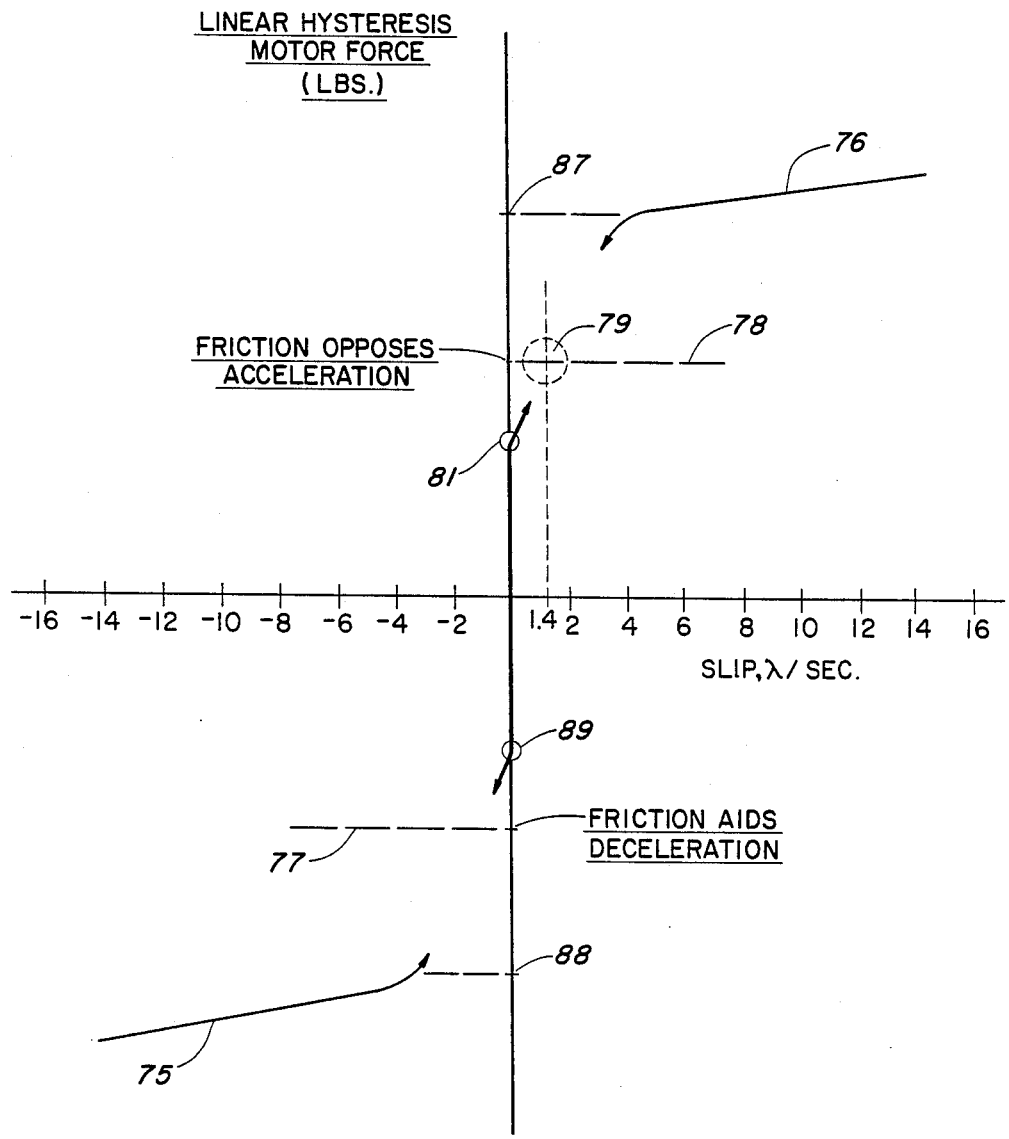
FIG. 7 is a graph of force versus slip for a linear hysteresis motor.

In greater detail, a hysteresis linear motor develops approximately constant force over a large differential speed, i.e., slip, between the secondary speed and the EM wave speed. As with any motor, the EM wave speed is determined by the fixed pole pitch (lambda) of the primary windings, and the frequency of the alternating current in the coils (EM speed=2 lambda f). The force level developed by the hysteresis motor configuration is determined by the level of current in the coils in the primary that develops the EM wave acting on the hysteresis secondaries. A representative graph of the linear hysteresis motor force versus slip is shown in FIG. 7 for a given coil current. The force level and slope of the curve will vary with current and also changes slightly with slip along the curve at 75 and 76, for example.

As can be seen in FIG. 7, the hysteresis force does not remain at its second force level 87 and 88 at zero slip, but rather it tapers off within about +/−3 lambda/sec slip. The exact nature of the curve in this region is uncertain and is therefore not depicted in the figure. At zero slip, or synchronous speed, the motor behaves similar to a permanent magnet synchronous motor and the developed force is just enough to counteract the loads on the motor. In this example, the presence of a friction force acting on the carriage is shown superimposed at 77 and 78 for comparison. On the left of the plot, the hysteresis motor and friction act in the same direction, therefore, they work together to slow the carriage and reduce slip. On the right hand side of the plot, they act in opposite directions; if the friction force is greater than the first motor force 81 at zero slip (as illustrated at 78), the friction force will continue slowing the carriage until the carriage is going slower than the EM wave and positive slip exists. The system is now operating on the right side of the plot. As the carriage continues slowing, slip increases and the hysteresis motor force increases until it equals the friction force as at 79. A force balance then occurs and the slip stabilizes; friction forces now no longer decrease carriage speed. The carriage speed is now stabilized or essentially locked onto the EM wave speed at a low slip of about 1.4 lambda/sec as shown. This essentially locked-on condition does not necessarily occur when the EM wave speed and the carriage speed are exactly matched, but it does repeatedly occur at a predictable low slip. If the friction force is lower than the first motor force at 81, the carriage speed will exactly match the EM wave speed. At this stabilized, essentially locked-on condition and especially when the carriage is traveling synchronously at exactly the EM wave speed, the effect of random variables between carriages is essentially eliminated and all carriages travel at essentially the same speed. This obviously is a desirable condition that prevents carriage collisions.

To summarize the modes of operation possible with a hysteresis secondary linear motor, it can operate as follows:

"exactly synchronously" and "synchronously" - this is possible when externally applied forces are less than the first levels at about 81 and 89 in FIG. 7 and slip is zero;

"essentially synchronously" - possible when externally applied forces are less than the second levels at about 87 and 88 in FIG. 7 and slip is predictably a low value and changes only slightly with load; and "asynchronously" - possible when externally applied forces are greater than the second levels at about 87 and 88 in FIG. 7 and slip may change considerably with load.

When decelerating the carriages, the linear hysteresis motor generates an opposing essentially constant force over a certain distance, thereby removing kinetic energy from the carriage. The carriage energy is determined by its mass and velocity. Removing energy, therefore, decreases its velocity. The rate of deceleration can be varied by one of two methods. A first method is to vary the current to the primary, thereby varying the force developed on the hysteresis secondary and the carriage. A second method is to keep the current, and therefore the force, constant and vary the distance over which the force acts. This second method is accomplished by varying the distance over which slip occurs before the hysteresis secondary essentially locks onto the EM wave. Friction on the moving carriage also acts to decelerate it, but this is usually a force that is difficult to control and it may vary from carriage to carriage. It is desirable, therefore, to minimize the effects of slight variations in frictional force by operating the hysteresis motor relatively high force levels so frictional variations have a small relative effect on the total deceleration force acting on the carriage. For this reason, the second method of varying the deceleration is preferred, since the motor force can remain at a nearly constant high level. This method will now be described in greater detail, referring specifically to FIG. 3.

Figure 3:
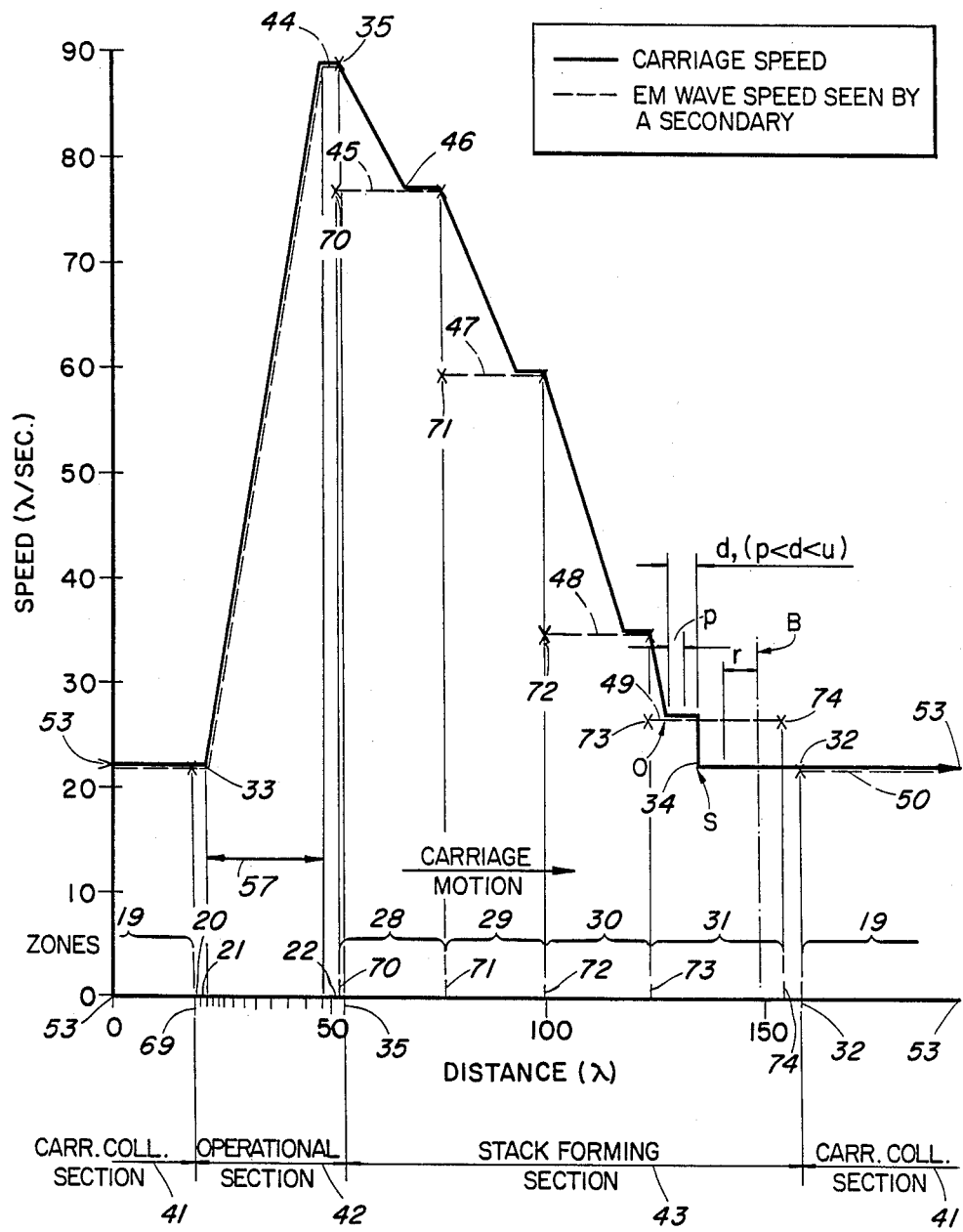
FIG. 3 is a graph of one case of secondary (carriage) velocity versus position as it travels around the endless loop.

A typical operation of the system of this invention is best seen by referring to FIGS. 3, 4, 5 and 6. To simplify the discussion, it is assumed that the maximum achievable motor force at zero slip is higher than the friction force so the carriage speed equals the EM wave speed and the carriage will travel exactly synchronously. In FIG. 3, the solid line plot of speed versus position represents the carriage speed and the dashed line plot represents the EM wave speed seen by a secondary, shown slightly offset for clarity. The origin and end positions on the plots join to define the loop and roughly correspond to position 53 in FIG. 4. The carriages are propelled from a continuous abutted stack extending from the position 33 in the operational section 42 of the loop to a spaced apart condition, at 35, and then are moved together along the stack forming section 43 of the loop and enter the stack at about 34. The carriages then move through the carriage collection section 41 in an abutted condition with their speed controlled by the EM wave developed in zone 19 acting on the upper synchronous secondary 3 of each carriage. The carriages are individually accelerated in the acceleration portion 57 by the independently controlled upper primary zones 20-22 of the upper primary 5, which develops EM waves that act to individually accelerate the upper synchronous secondaries 3. In the operational section extending from 69 to 35 there are thirteen independently controlled zones, in the embodiment shown.

In the example shown in FIG. 4, there are thirty-six carriages in the endless loop. The carriages enter the acceleration portion 57 of the operational section 42 abutted and spaced one carriage length between centers, traveling at a first speed of 22.2 lambda/sec. At the end of the acceleration portion they are shown spaced 4 carriage lengths apart and reach a final second speed of 88.8 lambda/sec before leaving the operational section 42. The carriages have undergone a speed and spacing change of 4x. The frequency of the AC power developing the EM wave is changing in a repeating sawtooth pattern in each zone to cause this acceleration. The secondaries are not in a zone, however, during that zone's reset portion of the sawtooth pattern. They only see a continuously increasing EM wave, as depicted by the sloping part of the dashed plot in FIG. 3. In the zones within operational section 42 there is never more than one carriage in a zone at a time.

Near the end of the operational section 42, the lower primary begins at 70 and develops an EM wave that acts on the lower hysteresis secondary 4 on each carriage. The last upper primary EM wave, developed in zone 22, at its maximum speed is traveling at 88.8 lambda/sec, as shown in 44 in FIG. 3, and is propelling the synchronous secondaries 3 at this speed as each carriage approaches the end of such zone. The first lower primary EM wave, from zone 28, is set to travel at a speed of about 76.9 lambda/sec, at 45, determined by the constant frequency of the AC power developing the wave in the primary. The hysteresis secondary on the carriage will initially slip on this wave and start decelerating as it enters the stack forming section, at 35. The carriage will continue decelerating until it reaches the EM wave speed of zone 28, at about 46. There may be several carriages in a single deceleration zone, such as zone 28, at a time. Upon reaching the EM wave speed, the hysteresis secondary 4 will stop slipping and act like a synchronous secondary and will cause the carriage to travel synchronously at the wave speed of 76.9 lambda/sec.

The EM wave in the next lower primary zone is set to travel at a speed of 59.4 lambda/sec, at dashed line 47, which will act to further decelerate the hysteresis secondary 4 attached to each carriage from 76.9 lambda/sec to 59.4 lambda/sec. The next lower primary zone 30 further slows the carriage to 33.9 lambda/sec, at 48, and the following zone 31 brings the carriage down to the overspeed velocity, or third speed, of 26.7 lambda/sec, at 49.

The carriage encounters the stack, which is traveling at the first speed of 22.2 lambda/sec within zone 31, at about position 34. This stack speed is determined by the EM wave velocity of 22.2 lambda/sec at dashed line 50 in zone 19 in the carriage collection section 41. The differential velocity, or impact speed, between the carriage and stack at impact is 4.5 lambda/sec which is sufficiently low that it can be absorbed by conventional shock absorbing devices on each carriage, such as a rubber bumper. After absorbing the impact, the shock absorbing device should not prevent the carriages from abutting at the proper pitch to be in synchronism with a common EM wave propelling the multiple carriages simultaneously, as in zone 19, in the carriage collection section 41. Since the secondaries are not independently accelerating in zone 19 they can all be synchronously driven by a common EM wave in this zone.

For a given total number of carriages in the loop, the stack length changes as a result of changes in the spacing of the carriages in the operational section of the loop and the final velocity reached. If the operational section carriage spacing decreases, the number of carriages in that section increases and the number in the stack forming section decreases. Conversely, if the carriage spacing in the operational section increases, the number of carriages in that section decreases and the number in the stack forming section increases.

The distribution of the carriages in the stack forming section may vary, however, depending on the amount of energy that must be dissipated, based on the carriage final velocity, and the constraints of some "desired results" explained below. In some instances, where it may be desirable to minimize the number of carriages in the loop, it is possible to increase the carriage speed above the second speed as the carriages leave the operational section and enter the stack forming section. This would cause the carriages to reach the stack sooner than the preferred case described where no acceleration occurs in the stack forming section. For the same stack length, when the carriages get to the stack sooner, fewer carriages are required in the stack forming section and, therefore, in the system. The stack length or stack entrance position will be affected by the carriage distribution which is best understood by referring to FIG. 8 to be discussed later.

In selecting the deceleration profile, i.e., the speed versus position of the carriage as it decelerates, there are usually many different profiles that will achieve the desired results. The critical parameter that must be controlled is the position of the entrance end of the stack. Two critical conditions must be maintained:

First, the minimum, or shortest, stack entrance position "B" must occur well before the carriages leave the last lower primary (hysteresis) zone 31 as shown in FIG. 3; otherwise, the carriages will not be pressed together and may arrive out of sync with the EM wave in upper primary zone 19, and subsequent control of the carriages in the synchronous acceleration portion is not possible.

Second, the maximum, or longest, stack entrance position must not occur before the carriages have reached the overspeed velocity such as preceding postiion "0"; otherwise, the impact velocity is no longer accurately controlled and small stack end position variations result in large changes in impact velocity which may eventually damage the carriages.

These two conditions still leave the solution for selecting the precise operating conditions undetermined. Other constraints useful to select EM wave speed setpoints for the return zones will be discussed. In describing the hysteresis motor above, the preferred method to control the hysteresis motor is keep the force, i.e., current, constant and vary the distance over which the carriage is decelerated in each zone. Some "desired results" in decelerating the carriage at a constant force are the following:

A. Each carriage should essentially lock onto the EM wave in each deceleration zone before leaving the zone, so the carriage speed is checked to a known value in each zone;
B. Each carriage should reach the actual entrance end-of-stack position, S, at least some preselected distance, p (say 4 lambda), after reaching overspeed (position "0") and at least some preselected distance, r (say 10 lambda) before reaching the minimum end of stack position B. This allows for some variation in position S without reaching the limit of the two critical conditions;
C. The distance, d, each carriage travels at the overspeed velocity before reaching the actual end-of-stack position is minimized to less than some preselected distance, u (say 8 lambda). Small values for d causes the carriage to catch up to the stack more rapidly. However, distance d should also be somewhat greater than p to avoid operating near a limit that would require changing several control zone frequency settings for small changes in operating conditions. Distance d, then should be more than p and less than u (4 lambda <d <8 lambda; actual values will vary with the overall size of the system, number of carriages involved, speeds, etc.);
D. When changing from one operating condition to another, the deceleration should always be altered progressively from one zone to the next in a smooth systematic fashion;
E. The stack should be kept as long as possible within the limits of the other constraints. To accomplish this, the carriage speeds should be kept as high as possible in all zones in the stack forming section. Having a long stack permits the greatest drift in stack length during actual operation before the first critical condition is violated which results in misoperation of the system.

This last "desired result" is an important one that has significant advantages that enhance reliable operation of the system. The carriage travel is mot predictable when traveling essentially locked onto the constant speed EM wave. By keeping the speed high and constant for as long as possible in the stack forming section, and then decelerating rapidly in a short distance, the carriages reach the stack quickly which keeps the stack long. At the high constant speeds there is minimal chance for collision; within the stack, obviously, there are no collisions; and the rapid deceleration exposes the carriage to collision for the shortest possible time. Further, the high motor force required for rapid deceleration tends to minimize some of the random effects, such as friction.

The EM wave velocities of the deceleration zones, determined by their drive frequencies, can be selected using any of a number of control algorithms. One such control algorithm uses a set of iterations based upon the percent of energy dissipated in each zone. This percent energy dissipated in a zone is equal to the energy used to decelerate a carriage in that zone given by the average decelerating force, F, times the distance, delta-L, over which the deceleration is occurring; divided by the total possible energy that can be provided by a zone which is given by the force, F, times the length of a zone, L. The algorithm requires that the same percent energy be dissipated in each zone in which a carriage is decelerated. During an iteration, a potential set of deceleration zone speeds are selected. These speeds are then entered into a Kinematic model that calculates the motion of the carriage through the system based on known deceleration forces such as from FIG. 7. The initial set of iterations determines where (which zone) the deceleration should begin. The final set of iterations adjusts the percent energy dissipated in each deceleration zone until the results are in compliance with all the constraints, such as the "desired results" mentioned above.

Figure 8:
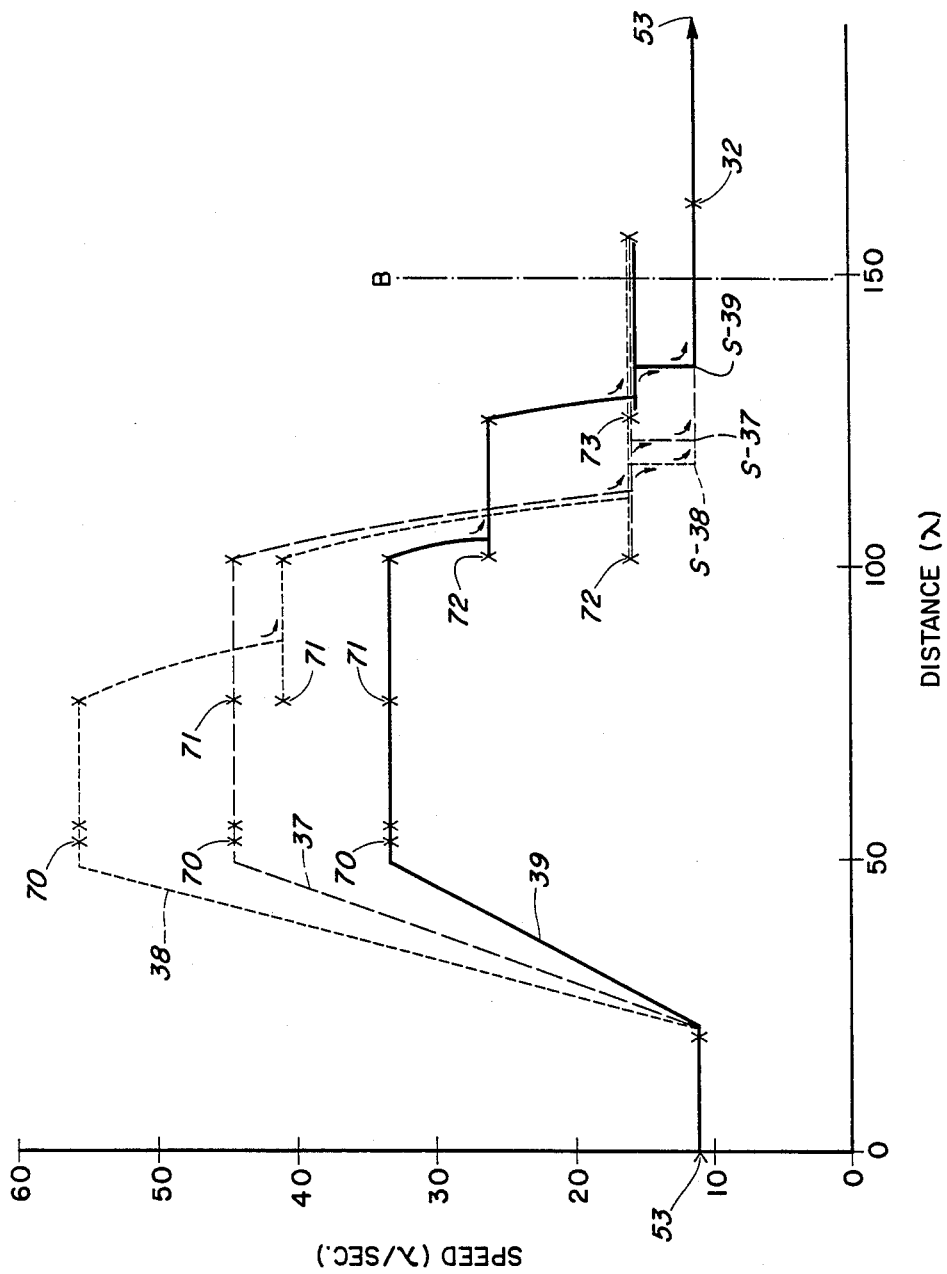
FIG. 8 is a graph of three cases of secondary (carriage) velocity versus position as it travels around the endless loop.

FIG. 8 shows three plots 37, 38 and 39 of speed versus position in the loop, similar to FIG. 3, but three different speed ratios are shown to illustrate how the system compensates and the actual entrance end-to-stack position can shift. Curve 37 shows a first operating condition that achieves a 4:1 velocity ratio, as in FIG. 3, but at lower velocities. Notice the entrance end-of-stack, S, in FIG. 3, is at 135 lambda while in FIG. 4, S-37 is at 121 lambda making the stack longer. The number of carriages in the stack forming section, however, is the same in both cases, but the carriage energy ($\frac{1}{2}$ Mv$^2$) in FIG. 3 where the carriage decelerates from 88.8 lambda/sec is much greater than in FIG. 8 where the carriage decelerates from 44.4 lambda/sec. Since it is preferred that the deceleration force be the same in both cases, in FIG. 3 the force must be applied over a much longer distance to dissipate the greater energy. The length and number of deceleration zones also effects the distribution of secondaries since the carriage cannot start decelerating in the middle of a deceleration zone. The deceleration "step" can only be taken starting at the entrance to the zones as shown at 70, 71, 72 and 73 in FIGS. 3 and 6.

Curve 38 shows an operating condition that achieves a 5:1 speed ratio which increases the separation of carriages in the operational section compared to curve 37 and, and therefore, increases the number of carriages in the stack forming section. This results in a slight increase in the stack length as illustrated by the end-of-stack S-38 shifting to the left of S-37.

Curve 39 shows an operating condition that achieves a 3:1 speed ratio which decreases the separation of carriages in the operational section compared to curve 37 and, therefore, decreases the number of carriages in the stack forming section. This results in a slight decrease in stack length as illustrated by the end-of-stack S-39 shifting to the right of S-37.

In spite of the fact that the hysteresis linear motor used to propel the carriages on the return sides of the loop is not always synchronous and no feedback is employed, it, nonetheless, is a stable, robust system under expected variations in individual carriage driving force or friction. This is so for the following reasons:
1. The speed of each decelerating carriage is checked to a set value in each zone as the hysteresis secondary reaches synchronous speed before leaving each zone, thereby limiting the time and distance over which variations can occur.
2. The carriages are driven into the stack at a constant fixed overspeed that permits the carriages to catch up, or the stack length to change rapidly, to compensate for variations in uncontrolled variables, thereby preventing the entrance end of the stack from reaching an inoperable position.
3. The selection of the zone frequency set points in the stack forming section are chosen to cause the entrance end-of-stack position to be initially located between the two extremes discussed that would cause operability problems.

To illustrate the ability of the system to be self-compensating, it is important to understand that the total time a carriage spends in the stack forming section is a fixed time for a given operating condition for the synchronous operational section. For each carriage leaving the operational section and entering the stack forming section, a carriage must leave the stack forming section, enter the stack and thereby return a carriage to the operational section. FIG. 9 shows the effect in the stack forming section of variations of an uncontrolled variable, such as carriage friction, on the stability of the system.

To set up a base case condition in a model of the system for evaluating friction variables, the operational section conditions in FIG. 3 were maintained and the stack forming section conditions were varied by assuming changes in the value of friction for the carriages. To exaggerate the effect to a worst case condition, the base case carriage friction force was assumed to be about 17% of the average carriage deceleration force. (Ordinarily friction forces are more like 1¾% as they were for FIG. 3). For this base case the operating speed (related to drive frequency) for each decleration zone EM wave was determined. In FIG. 9, these speed values and other variables were held constant while average carriage friction was varied plus and minus 50%. For the base case with 17R friction, the stack position S-54 was 75.3 lambda. The deceleration curve for the base case is omitted for clarity. Dashed line curve 55 shows the result of decreasing the carriage friction to about 8½%. The carriages now do not decelerate quite as rapidly (since friction aids deceleration) therefore the carriages reach the stack sooner so the stack grows slightly to compensate by moving left to position 74 lambda at S-55. With an increased stack, however, the carriages travel longer at the lower stack speed so the total time in the stack forming section remains the same and the new stable operating condition of curve 55 is established.

Curve 56 shows the opposite condition of assuming an increase in the average friction of the carriage to 25½%. In this case the carriage decelerates more rapidly and takes longer to reach the stack which has shortened slightly to compensate by moving right to 76.7 lambda at S-56. Now, however, the carriages travel longer at the higher overspeed velocity so the total time in the stack forming section remains the same and the new stable operating condition of curve 56 is established. It is important to note that in both curves 55 and 56, the stack entrance positions S-55 and S-56 did not reach critical limits O-55, O-56 or B for that operating condition.

In the cases shown here, the acceleration portion is short so the number of carriages affected by spacing changes is small and the stack entrance position variations can be measured in a few lambda. In loops having a long acceleration portion which may also include a longer constant speed portion than is shown at 44 in FIG. 3, many more carriages are involved before reaching the stack forming section, but the hysteresis motor system works just as well in this case and can easily accommodate large changes of one hundred lambda or more in the stack entrance position.

During start up from zero speed and during changes from one velocity ratio to another as shown in FIG. 8, the EM wave velocities in each zone on the return side must be adjusted periodically during operation. This is required to maintain a stable stack entrance condition as the carriages change energy (speed) and/or spacing entering the stack forming section. Updating the stack forming section EM wave speeds by resetting the drive frequencies to newly calculated values about every ½ second will achieve the required stability in the stack forming section. The carriage speed and spacing entering the stack forming section is known from the predetermined operating conditions in the operational section, which are discussed in the Hommes and Keegan Pat. No., 4,675,582 referenced previously. System computer 51 controls the stack forming section zone drive frequency adjustments and coordinates them with the operational section operating conditions. Such functions of a computer control system are known to one skilled in this art so further discussion of control details is not necessary.

In the version of the endless loop concept shown in FIGS. 1 and 4, the linear motor primaries are not continuously acting on either one or the other secondary as a gap exists between where the lower primary ends at 74 and the upper primary beings at 32.

In a modified system, along the stack forming section the lower primary can also have gaps between zones to save the cost of primary and for structural convenience. Since the carriages are being slowed from an elevated speed, they have sufficient inertia to pass across the gaps in a predictable manner. Some form of auxiliary or operator assist can be provided in the gaps as desired to insure carriages do not become "stranded" there at shutdown.

The carriage collection section may also contain gaps in zone 19. For instance, zone 19 can consist of two straight segments preceding and following the turn-around curve with no primary present in the curve since curve primaries are difficult and expensive to fabricate. The two separate straight segments would be operated together like a single zone and would be mechanically spaced at the same pitch as the secondaries on the abutted carriages filling both segments and the curve. The abutted carriages would be pushed through the unpowered curve.

The concept of using a carriage having a synchronous and hysteresis secondary has been described where only one secondary was acted on by a primary at a time. It is also contemplated that whenever the synchronous secondary is being acted on, a primary could be added to also act on the hysteresis secondary at the same time using the same or a different speed EM wave. This would have the advantage of providing additional driving force on the carriage and could be used to damp out speed oscillations associated with the synchronous secondary.

It is also contemplated that the synchronous secondary and upper primary could be eliminated and the lower primary could be extended to propel the hysteresis secondary completely around the loop. In the carriage collection section, the hysteresis secondary would be propelled synchronously to insure a known position versus time for the carriages at one point in the loop. On the operational side of the loop the hysteresis secondary can be propelled either synchronously, using the same zones and EM wave segments as were used for the synchronous secondary, or asynchronously and essentially synchronously in a manner opposite that used on the stack forming side. When the hysteresis secondaries are propelled asynchronously, the percent difference in loading on each carriage at a given position in the system should be minimized to insure predictable performance from carriage to carriage. This is required so the time it takes each carriage to pass through the operational side is predictable and repeatable for each carriage. This will decrease the possibility of uncontrolled collisions during decelerations on the stack forming side.

In the preferred embodiment of this invention linear motors are used for propulsion throughout, however, the carriages also may advantageously be propelled by a combination of a hysteresis linear motor and a mechanical sprocket and/or screw engaging the carriages. For instance, in a film tenter system, such as that shown in U.S. Pat. No. 3,932,919 to Hutzenlamb, for example, a sprocket engages the carriages in a stack and propels them at a first speed synchronously, in non-slipping engagement with a drive means whose speed and position can be controlled precisely, and acts as a carriage collection section. The carriages are then passed in abutment (i.e., synchronism is maintained) to a screw with increasing pitch that is synchronously geared to the sprocket. The screw synchronously spaces the carriages apart and propels them synchronously to a second speed, acting as an operational section. At this point, the hysteresis linear motor of the instant invention can be used to engage the carriages and propel them at the second speed, then return the carriages back to the stack by decelerating them to a third speed and abut them with the stack at a controlled impact speed, and press the carriages into the stack, thereby acting as a stack forming section. Such a system would eliminate the costly, complex, and speed limiting system (used in this patent) of a chain, decreasing pitch screw, and adjustable pitch screw elements to return the carriages, which elements must be changed each time a different increasing pitch screw is selected. To accomplish improved operation, each carriage would receive a hysteresis secondary, and a primary with a plurality of zones and controls would be located at appropriate positions along the endless loop. The hysteresis linear motor would be operated according to the teachings of this invention to return the carriages, to the stack.

We claim:

1. A method of controlling the propulsion of carriages traveling along an endless path including the steps of:
   forming a stack of carriages;
   controlling the movement of carriages in the stack in a carriage collection section, such collection section having an entrance and exit;
   propelling the carriages in the collection section at a first constant speed;
   propelling the carriages one by one from the exit of the collection section and into an operational section, and propelling the carriages through the operational section from the first speed to a second speed greater than the first speed whereby such carriages are spaced apart; and
   propelling the spaced apart carriages into and through a stack forming section wherein such carriages are propelled from the second speed to a third speed prior to reaching the trailing carriage in the stack of carriages traveling at the first speed before such carriages reach the entrance of the collection section; and
   wherein the third speed acts to propel the carriages into controlled abutment with the trailing carriage in the stack.

2. The method of claim 1 wherein there is a stepped deceleration of the carriages in the stack forming section from the second speed to a third speed prior to reaching the trailing carriage in the stack.

3. The method of claim 2 wherein all of the carriages in the stack are in an abutting relationship.

4. The method of claim 2 wherein all of the carriages in the carriage collection section are in an abutting relationship.

5. The method of claim 2 wherein the third speed at which each carriage is propelled in the stack forming section is greater than the first speed at which the carriages in the stack are propelled in the carriage collection section.

6. The method of claim 1 wherein the carriages in the stack forming section are constrained to move abutted in that section at the first speed as controlled by the movement of the carriages in the stack in the carriage collection section.

7. The method of claim 2 wherein a force is applied to the carriages in the stack forming section that initially forces the spaced apart carriages to move at the third speed and then forces the carriages together where they are constrained to move at the first speed at which the carriages are being propelled in the carriage collection section.

8. The method of claim 2, wherein the carriages are decelerated in the stack forming section from the second speed to a fourth speed before being decelerated further to the third speed.

9. The method of claim 2 wherein the carriages are propelled along the endless path by a linear motor including at least a first primary positioned adjacent the path and a secondary attached to each of the carriages.

10. The method of claim 9 wherein the primary has coils electrically grouped into zones including at least a first zone positioned along the carriage collection section for developing a first electromagnetic wave for engaging the secondaries to propel the carriages in the carriage collection section at the first speed.

11. The method of claim 10 wherein the electromagnetic wave in the first zone engages the secondaries to propel the carriages synchronously at the first speed.

12. The method of claim 11 wherein the primary further includes at least a second zone positioned along the operational section for propelling each carriage from the first speed to the second speed which is greater than the first speed whereby to space the carriages apart in this section.

13. The method of claim 12 wherein an electromagnetic wave developed in the second zone engages the secondaries one at a time to propel the carriages synchronously from the first speed to the second speed whereby to space the carriages apart in the operational section.

14. The method of claim 11 wherein the primary further includes a plurality of second zones positioned along the operational section for propelling each carriage from the first speed to speeds greater than the first speed whereby to space the carriages apart in this section.

15. The method of claim 14 wherein an electromagnetic wave developed in each of the plurality of second zones engages the secondaries one at a time to propel the carriages synchronously from the first speed to speeds greater than the first speed whereby to space the carriages apart in such operational section.

16. The method of claim 15 wherein each carriage has at least a synchronous secondary attached thereto.

17. The method of claim 15 wherein each carriage has a hysteresis secondary attached thereto.

18. The method of claim 16 wherein each carriage further has a hysteresis secondary attached thereto and wherein the primary further includes at least a third zone positioned along the stack forming section for propelling the carriages from the second speed to the third speed, which is less than the second speed, thereby spacing the carriages closer together in the stack forming section.

19. The method of claim 2 wherein the carriages are propelled along the endless path by a linear motor including at least a first primary positioned adjacent the path and a hysteresis secondary attached to each of the carriages.

20. The method of claim 19 wherein the primary has coils electrically grouped into zones including a first zone positioned along the carriage collection section for developing a first electromagnetic wave for engaging the hysteresis secondaries thereby to propel the carriages synchronously at the first speed in the carriage collection section.

21. The method of claim 20 wherein the primary further includes at least a second zone positioned along the operational section for developing a second electromagnetic wave for propelling each carriage from the first speed to the second speed which is greater than the first speed whereby to space the carriages apart in this section.

22. The method of claim 21 wherein the second electromagnetic wave developed in the second zone engages the hysteresis secondaries thereby to propel the carriages synchronously from the first speed to the second speed in the operational section.

23. The method of claim 21 wherein the second electromagnetic wave developed in the second zone engages the hysteresis secondaries thereby to propel the carriages asynchronously from the first speed to the second speed and then essentially synchronously at the second speed in the second zone in the operational section.

24. The method of claim 21 wherein the carriages are decelerated in the stack forming section from the second speed to a third speed prior to reaching the trailing carriage in the stack.

25. The method of claim 21 wherein the primary further includes at least a third zone positioned along the stack forming section for developing a third electromagnetic wave for propelling the carriages from the second speed to a third speed, which is less than the second speed, in this section.

26. The method of claim 25 wherein the third electromagnetic wave developed in the third zone engages the hysteresis secondaries whereby to propel the carriages essentially synchronously in the stack forming section prior to reaching the trailing carriage in the stack.

27. The method of claim 25 wherein the third electromagnetic wave developed in the third zone engages the hysteresis secondaries whereby to propel the carriages asynchronously in the stack forming section after the carriages reach the stack and prior to the entrance of the carriage collection section.

28. The method of claim 2 wherein the carriages are propelled along the endless path by a linear motor including first and second primaries positioned adjacent the path and secondaries attached to the carriages.

29. The method of claim 28 wherein the first primary has coils electrically grouped into zones including at least a first zone positioned along the carriage collection section for developing a first electromagnetic wave for engaging the secondaries to propel the carriages at the first speed in this section.

30. The method of claim 29 wherein each carriage has a synchronous and a hysteresis secondary attached thereto.

31. The method of claim 30 wherein the first electromagnetic wave developed in the first zone engages the synchronous secondaries whereby to propel the carriages synchronously at the first speed in the carriage collection section.

32. The method of claim 31 wherein the first primary further includes at least a second zone positioned along the operational section for developing a second electromagnetic wave for propelling each carriage from the first speed to the second speed which is greater than the first speed whereby to space the carriages apart in this section.

33. The method of claim 32 wherein the second electromagnetic wave developed in the second zone engages the synchronous secondaries one at a time to propel the carriages synchronously from the first speed to the second speed in the operational section.

34. The method of claim 32 wherein the second primary includes at least a third zone positioned along the stack forming section for developing a third electromagnetic wave for propelling the carriages from the second speed to the third speed, which is less than the second speed, in this section.

35. The method of claim 34 wherein the third electromagnetic wave developed in the third zone engages the hysteresis secondaries thereby to decelerate the speed of the carriages from the second speed to the third speed before reaching the trailing carriage in the stack of abutting carriages in the stack forming section.

36. The method of claim 35 wherein the third electromagnetic wave developed in the third zone engages the hysteresis secondaries whereby to propel the carriages essentially synchronously in the stack forming section prior to reaching the trailing carriage in the stack.

37. The method of claim 35 wherein the third electromagnetic wave developed in the third zone engages the hysteresis secondaries whereby to propel the carriages asynchronously in the stack forming section after the carriages reach the stack and prior to reaching the entrance of the carriage collection section.

38. The method of claim 34 wherein the second primary further includes at least a fourth zone positioned along the stack forming section and preceding the third zone for developing a fourth electromagnetic wave for engaging the hysteresis secondaries to thereby propel the carriages from the second speed to a fourth speed.

39. A method of controlling the movement of a plurality of carriages using a linear motor having hysteresis and synchronous secondaries attached to the carriages that are traveling continuously in an endless loop defined by a guide track and propelled by discrete zones of linear motor primaries positioned adjacent the track, including the steps of:
propelling the carriages along a first zone of a first primary by acting on the synchronous secondaries to propel the carriages in an abutting relationship in a stack, in a carriage collection section, at a first constant speed;
propelling the carriages along a second zone of the first primary by acting on the synchronous secondaries one by one to accelerate the carriages, in an operational section, from the first speed abutted to a second speed spaced apart;

propelling the carriages along a third zone of a second primary by acting on the hysteresis secondaries to decelerate the carriages, in a stack forming section, from the second speed spaced apart to a third speed close together, the third speed being greater than the first speed;

essentially synchronously propelling the carriages along one part of the third zone at the third speed prior to contact with the abutting carriages in the stack forming section; and asynchronously propelling the carriages along another part of the third zone to produce an abutting force which presses the carriages into the abutted carriages which are moving at the first speed in the stack forming section.

40. A method of controlling the propulsion of a plurality of spaced apart carriages into a stack of moving abutted carriages including the steps of:

propelling the abutted stack of carriages at a first speed;

propelling a spaced apart carriage into a controlled impacting abutment with the stack of abutted carriages by propelling the spaced apart carriages at second speed greater than the first speed before the carriage reaches the stack, using a linear motor.

41. A method of propelling articles along an endless path from a collection section exit to a spaced-apart condition and back to the collection section entrance including the steps of:

propelling the articles using a linear motor primary adjacent the path and at least hysteresis secondaries attached to the articles;

propelling the articles in the collection section wherein the articles are abutted in a stack;

propelling the articles from the stack to a spaced-apart condition; and propelling the articles back into the stack under control of the hysteresis secondaries.

42. A method of controlling the propulsion of a plurality of spaced apart carriages into a stack of moving abutted carriages including the steps of:

propelling a spaced apart carriage synchronously with respect to an electromagnetic wave developed by a linear motor at an overspeed, in a stack forming section, prior to reaching the trailing carriage in the stack which is traveling at a first speed less than the overspeed; and propelling the carriage asynchronously with respect to the same electromagnetic wave, in the stack forming section, after the carriages reach the stack.

43. The method of claim 42 in which the linear motor comprises a primary and a hysteresis secondary attached to each of the carriages.

44. The method of claim 42 including the further step of propelling abutted carriages in the stack synchronously at the first speed with respect to another electromagnetic wave.

45. A method of controlling the propulsion of carriages traveling along an endless path including the steps of:

forming a stack of carriages;

controlling the movement of carriages in the stack in a carriage collection section, such collection section having an entrance and exit;

propelling the carriages in the collection section at a first constant speed;

propelling the carriages one by one from the exit of the collection section and into an operational section, and propelling the carriages through the operational section from the first speed to an overspeed greater than the first speed whereby such carriages are spaced apart; and propelling the spaced apart carriages into and through a stack forming section wherein such carriages are propelled from the overspeed into the stack of carriages traveling at the first speed before such carriages reach the entrance of the collection section; and wherein the overspeed acts to propel the carriages into controlled abutment with the trailing carriage in the stack and into pressure abutment within the stack.

46. An apparatus for propelling carriages from a carriage collection section to a spaced-apart condition and back to the collection section by propelling the carriages along an endless track using a linear motor, such apparatus including:

a first elongated primary positioned along a first part of the endless track and a second elongated primary positioned along a second part of the track;

a plurality of carriages guided around the track, each having a synchronous secondary adjacent the first primary and a hysteresis secondary adjacent the second primary;

a carriage collection section having an entrance and an exit;

and control means for each primary whereby the first primary propels the carriages through the collection section exit and accelerates them from an abutted to a spaced-apart condition, and whereby the second primary decelerates the carriages, propels them into an abutted condition in a moving stack and applies pressure to the abutted carriages at the collection section entrance.

47. The apparatus of claim 46 wherein the entrance to the carriage collection section is located at the beginning of the first primary.

48. The apparatus of claim 46 wherein the trailing carriage in the moving stack of abutted carriages is always located before the end of the second primary.

49. An apparatus for propelling carriages from a collection section exit to a spaced apart condition and back to a collection second entrance by propelling the carriages along an endless track, using a linear motor, such apparatus including:

a first primary positioned along a first part of the endless track, and a second primary positioned along a second part of the track;

a plurality of carriages guided around the track, each having a synchronous secondary positioned adjacent the first primary and a hysteresis secondary positioned adjacent the second primary;

such collection section having an entrance located at the beginning of the first primary and an exit located before the end of the first primary;

a stack forming section located adjacent the second primary; and the primaries having a plurality of coils electrically grouped into zones for controlling the movement of the carriages around the track.

50. An apparatus for propelling carriages along an endless path defined by a guide track, using a linear motor, comprising:

a first primary positioned adjacent a first part of the track;

a second primary positioned adjacent a second part of the track;

a plurality of carriages guided by the track;

each carriage having a synchronous and a hysteresis secondary attached thereto;

such first primary including coils electrically grouped into zones including:

a first zone and;

a plurality of second zones;

such second primary including coils electrically grouped into zones including a plurality of zones such apparatus further comprising:

a carriage collection section;

an operational section; and a stack forming section;

such carriage collection section having an entrance and an exit; and wherein one end of the first zone of the first primary is located adjacent the entrance to the carriage collection section;

wherein the other end of the first zone of the first primary is located adjacent the exit of the carriage collection section;

wherein one end of the first of the plurality of second zones of the first primary is located adjacent the start of the operational section;

wherein the other end of the last of the plurality of second zones of the first primary is located adjacent the finish of the operational section;

wherein the plurality of zones of the second primary are located adjacent the stack forming section; and means to develop electromagnetic waves in each of the zones for controlling the propelling of the carriages through all the sections.

51. In a linear motor a carriage adapted to be propelled along an elongated track adjacent a first and second linear motor primary, comprising:

a first surface for attachment to an article;

a second surface having attached thereto a linear motor synchronous secondary consisting of a high permeability material, and at least two magnets attached to the high permeability material, with the magnets defining a third surface adapted to define a constant clearance gap with the first adjacent primary;

a fourth surface having attached thereto a linear motor hysteresis secondary consisting of a material having high magnetic hysteresis, the material with high hysteresis defining a fifth surface adapted to define a constant clearance gap with the second adjacent primary.

52. The linear motor of claim 51, wherein the synchronous secondary magnet material is samarium cobalt and the hysteresis secondary material with high hysteresis is unmagnitized alnico.

53. The linear motor of claim 51, wherein the synchronous secondary magnet is samarium cobalt and the hysteresis secondary material with high hysteresis is unmagnetized samarium cobalt.

54. The linear motor of claim 51, wherein the synchronous secondary magnet material is alnico and the hysteresis secondary material with high hysteresis is unmagnetized alnico.

55. A method of controlling the propulsion of a plurality of spaced apart carriages into a stack of moving abutted carriages including the steps of:

propelling a spaced apart carriage synchronously with respect to an electromagnetic wave developed by a linear motor at an overspeed, in a stack forming section, prior to reaching the trailing carriage in the stack which is traveling at a first speed less than the overspeed; and propelling the carriages asynchronously with respect to another electromagnetic wave, in the stack forming section, after the carriages reach the stack and wherein the electromagnetic waves are traveling at the same speed.

56. A carriage for a linear motor, comprising:

a carriage body having means to support the carriage for travel along a path thereby defining a carriage travel axis;

a synchronous secondary attached to the carriage body, the secondary comprising a high magnetic permeability material with at least two magnets attached to the material, the magnets defining a firt surface facing outward from the body and parallel to the carriage travel axis;

a hysteresis secondary attached to the carriage body, the hysteresis secondary comprising a material having high magnetic hysteresis, the material defining a second surface facing outward from the body and parallel to the carriage travel axis; and the first and second surfaces each tracing a continuous two dimensional path in the direction of travel of the carriage, the path traced by the first and second surfaces being spaced from each other and facing in different directions.

57. A method of controlling the propulsion of carriages traveling along an endless path including the steps of:

forming a stack of carriages;

controlling the movement of carriages in the stack in a carriage collection section, such collection section having an entrance and exit;

propelling the carriages in the collection section at a first constant speed;

propelling the carriages one by one from the exit of the collection section and into an operational section, and propelling the carriages through the operational section from the first speed to a second speed greater than the first speed whereby such carriages are spaced apart; and propelling the spaced apart carriages into and through a stack forming section wherein such carriages are propelled from the second speed into the stack of carriages traveling at the first speed before such carriages reach the entrance of the collection section; and wherein the second speed acts to propel the carriages into controlled abutment with the trailing carriage in the stack and into pressure abutment within the stack.

* * * * *